United States Patent Office 2,943,011
Patented June 28, 1960

---

2,943,011

PROCESS FOR SECURING ADHESION BETWEEN SURFACES AND MATERIAL THEREFOR

Claude Albert Abbs Rayner, Duxford, England, assignor to Ciba Limited, Basel, Switzerland, a Swiss firm No Drawing. Filed Feb. 25, 1955, Ser. No. 490,685

Claims priority, application Great Britain Feb. 25, 1954

15 Claims. (Cl. 154—140)

This invention relates to processes of effecting adhesion and to materials for use therein.

It is known that some synthetic linear polyamides have adhesive properties so that they may be used in effecting adhesion between surfaces, e.g. between two metal surfaces. The general methods employed is to locate a body of the polyamide between the surfaces to be joined and then to subject the assembly to heat and pressure, the temperature used commonly being that at which the polyamide melts or being just above that temperature and the pressure being sufficient to hold the elements of the assembly together. On cooling the assembly, a reasonably strong joint is obtained.

The present invention is concerned with a new method of effecting adhesion based on the use of a synthetic linear polyamide, which affords an adhesive joint of improved shear strength at normal and elevated temperatures and greatly increased peel strength.

According to the present invention a method of securing adhesion between two surfaces comprises locating between the surfaces which are to be adhered together a solid body consisting essentially of a synthetic linear polyamide of the "nylon" type (as hereinafter defined), providing between said body and said surfaces a thermosetting synthetic resin of phenolaldehyde type (as hereinafter defined), subjecting the assembly thus formed to a temperature sufficient to melt the polyamide, and to pressure at least sufficient to hold the assembly together, allowing the assembly to cool and then releasing the pressure. It is found that by the aforesaid method extremely strong and heat-resistant unions may be effected.

The invention is of especial value in securing adhesion between metal surfaces, e.g. of aluminium or titanium or their alloys, or of stainless steel, in particular in the sheet form as used in aircraft construction, but is of general applicability and can be used for securing adhesion between many materials which are commonly difficult to stick together, e.g. glass, porcelain and other ceramic materials and hard synthetic resinous materials such as thermo-set resins. The strength of the adhesive bond varies to some extent with the nature of the materials adhered together. By a thermosetting resin of the phenol-aldehyde type is intended not only those thermosetting resins obtained by the condensation of a phenol with an aldehyde (preferably formaldehyde) but also those resins of similar or identical structure obtainable by other reactions, e.g. by the condensation of a phenol with hexamethylene tetramine.

By the expression synthetic linear polyamide of the nylon type is meant a long-chain synthetic polymeric amide which has recurring amide groups as an integral part of the main polymer chain, and which is capable of being formed into a filament in which the structural elements are oriented in the direction of the axis.

One method of effecting adhesion according to this invention consists in providing a film or sheet of synthetic linear polyamide e.g. 0.003 to 0.10 inch thick, and applying either to the surfaces of the film or sheet or to the surfaces to be joined a thin coating of a thermosetting phenol-aldehyde resin, the synthetic linear polyamide film or sheet then being located between the surfaces to be joined and the assembly treated as described above. Instead of a self-supporting film of the synthetic linear polyamide there may be used a sheet of materal coated with the polyamide, e.g. a foraminous carrier sheet, such as a sheet of woven glass fibre, coated with the polyamide.

It is characteristic of this invention that there is initially provided a layer of thermosetting phenol-aldehyde resin between a solid body of synthetic linear polyamide and the surfaces to be joined, though some degree of interfusion of these materials takes place when the assembly is heated to melt the polyamide.

The invention may employ any of the well known forms of synthetic linear polyamide, for example those obtained by the condensation of dibasic acids such as sebacic acid, adipic or dilinoleic acid with diamines, of which the most common example is hexamethylene diamine. The aforesaid polyamides are of the general formula . . . $NH.R_1.NH.CO.R_2.CO$ . . . where $R_1$ and $R_2$ are linear aliphatic hydrocarbon chains. Their production is described in a substantial volume of patent literature, e.g. in British patent specification No. 461,237.

An alternative form of polyamide which may be employed and which presents advantages is that derived from caprolactam, ω-amino caproic acid or chemical nalogues. These polyamides which are described in British patent specification Nos. 461,236, 535,421 and in other patents, differ chemically from the types derived from diamine in that whereas the caprolactam types have recurring —NHCO— groups, the diamine types have alternating —NHCO— and —CONH— groups in the linear chain. Mixtures of polyamides or copolymers of polyamides may be employed.

Preferably, a thermosetting phenol aldehyde resin is selected which, under the conditions obtaining, does not cure before the polyamide melts. The commercially available polyamides of the diamine type melt at temperatures of the order of 220–260° C. Examples are polyhexamethylene sebacamide known as nylon 610 and having the recurring structural unit

. . . $NH(CH_2)_6NH.CO(CH_2)_8CO$ . . .

and polyhexamethylene adipamide known as nylon 66 and having the recurring structural unit

. . . $NH(CH_2)_6NH.CO(CH_2)_4CO$ . . .

Polyamides of lower melting point are, however, suitable and generally it may be stated that polyamides of melting point between 150° C. and 260° C. are useful in the method of the present invention.

The commercially available caprolactam-type polymers generally have melting points between about 185° C. and 215° C. Examples of such commercially available polymersa re the product sold under the trademark "Rilsan" (made by Societe Organico of France) and believed to be the polyamide of ω-amino undecylic acid and having the recurring structural unit . . . $NH(CH_2)_{10}CO$ . . ., and polycaprolactam having the recurring structural unit . . . $NH(CH_2)_5CO$ . . ..

Synthetic linear polyamides which contain substituent groups rendering them soluble in alcohol may also be employed.

The resin employed is preferably a thermo-setting phenolformaldehyde resin. Whilst the direct condensation products of phenol and formaldehyde are preferred, the term is to be understood to include the condensation products of formaldehyde with various phenols well known for use in resin formation, e.g. diphenylol propane, cresols, resorcinol and other monohydric and polyhydric phenols. Thermosetting resins derived from aldehydes other than formaldehyde may also be used, e.g. the phenol-furfural resins.

The following examples will serve to illustrate the invention but are not to be regarded as limiting it in any way. In these examples the following general data apply:

The aluminium alloy referred to in the examples was 0.036 inch thick; that used for shear tests conformed to specification D.T.D. (Directorate of Technical Development of the Ministry of Supply) 546B, and that for peeling tests conformed to specification D.T.D. 610B. Before use, the metal was degreased in a trichloroethylene vapour bath and cleaned in accordance with specification D.T.D. 915A.

The titanium referred to in the examples was .040 inch thick. After sand-blasting and degreasing it was cleaned by immersion in a 50% aqueous solution of nitric acid.

The stainless steel referred to in the examples contained 7% nickel and 17% chromium and was 0.125 inch thick. It was cleaned by sand-blasting.

In all overlap joints made for testing in shear, the width of the joint is 1 inch and the overlap ½ inch.

The phenol formaldehyde resin employed was prepared as follows:

1 mole of phenol and 1.1 moles of formaldehyde were reacted in the presence of 0.01 mole of caustic soda by the following technique. Phenol (94 g.) and formalin (89 g.) were mixed with water (56 g.) and a 20% aqueous solution of caustic soda (2 g.). The temperature of the mixture was raised carefully to boiling point (under reflux) so that the initial exothermic reaction would proceed gently. When this exothermic reaction was complete the resin solution was maintained at boiling point until the desired end point had been reached. After cooling to about 85° C. the resin solution was distilled under reduced pressure (about 25 mm. Hg) until dehydration was complete, this stage of the distillation being marked by a rapid rise in the temperature of the resin. At 80° C. the distillation was discontinued and the resin dissolved in sufficient ethyl alcohol to give a solution containing 75% resin solids.

Other resins having a ratio of phenol to formaldehyde in the range 1:0.9 to 1:2.0 can be prepared similarly. In each case 0.01 mole caustic soda is used per mole of phenol.

Below a phenol to formaldehyde ratio of 1:1.8 the quantity of water added in any reaction is such that the sum of the weights of formalin and water is constant. Above this ratio no water is added.

The peel strength referred to is a measure of the load required to peel apart the glued strips, 1" wide, the load being applied substantially at right angles to the plane of the glued joint as described in "Aircraft Engineering," March 1953.

Example I

Aluminum alloy sheets were prepared as described. A thin coating of 25% solution of phenol-formaldehyde resin in ethyl alcohol was applied to the metal surfaces and allowed to dry in the air for 30 minutes. A film of the synthetic linear polyamide Rilsan 0.01 inch thick was placed between metal surfaces and the assembly was heated and subjected to pressure. The assembly was then cooled and the pressure then released. The glued joints were tested for shear strength and for peel strength and gave the following failing loads under the conditions described:

|  | Pressing Conditions | Rilsan Grade BO | Rilsan Grade BOP20 | Rilsan Grade BOP40 |
|---|---|---|---|---|
| Average failing load at room temperature. | 10 mins. at 200° C. and pressure of 50 p.s.i. | Lbs. 2,250 | Lbs. 2,250 (including a large number of metal failures) | Lbs. 2,250 |
| Average failing load at 100° C. | ----do---- | 2,040 | 2,040 | 1,582 |
| Average failing load at 140° C. | ----do---- | 1,830 | 1,321 | 1,284 |
| Average failing load at room temperature. | 15 mins. at 185° C. and pressure of 10 p.s.i. |  |  | 2,250 |
| Average peel strength at room temperature over 1" width. | 10 mins. at 200° C. and pressure of 50 p.s.i. |  |  | 120 |
| Control (Rilsan along—no phenolic resin): Average failing load at room temperature. | 10 mins. at 200° C. and pressure of 50 p.s.i. | 1,400 | 1,900 | 1,741 |
| Peeling strength at room temperature. | ----do---- |  |  | 5 |

Example II

The procedure of Example I was followed using as the polyamide the caprolactam sold under the trademark Grilon, as a film 0.01 inch thick. The results obtained were as follows:

|  | Pressing Conditions | Grilon Grade A.22 |
|---|---|---|
| Average failing load at room temperature. | 10 mins. at 215° to 220° C. and a pressure of 50 p.s.i. | 2,216 lbs. (all metal failure). |
| Average failing load at 120° C. | ----do---- | 1,990 lbs. |
| Average failing load at 160° C. | ----do---- | 1,823 lbs. |
| Average peel strength at room temperature. | ----do---- | 35 lbs. |
| Control (Grilon alone—no phenolic resin): Average failing load (½" overlap). | ----do---- | 792 lbs. |
| Average peel strength. | ----do---- | 5 lbs. |

Example III

A number of shear joints were made by applying a 10% solution of a thermosetting phenol-formaldehyde resin in ethyl alcohol to the faces of aluminium test pieces, air-drying for 30 minutes, interposing a film of Rilsan B.C.O.P. 40 of between .005 and .010 inch thick and pressing for 4 minutes at a temperature of 185° C. and at a pressure of 10 pounds per square inch.

The average failing load measured at different temperatures was as follows.

Temperature:           Average failing load, lbs.
    −60° C. ------------------------------- 2323
    −20° C. ------------------------------- 2257
    +20° C. ------------------------------- 2226
    +100° C. ------------------------------ 1461
    +140° C. ------------------------------ 1140

Example IV

A number of shear joints were made by applying a 10% solution of a thermosetting phenol-formaldehyde resin in ethyl alcohol to the faces of aluminium test pieces, air-drying for 30 minutes, interposing a film of polycaprolactam of between .005 and .010 inch thick and pressing for 1 minute at a temperature of 220° C. and at a pressure of 10 pounds per square inch.

The average failing load measured at different temperatures was as follows.

Temperature:           Average failing load, lbs.
    −60° C. ------------------------------- 1544
    −20° C. ------------------------------- 1943
    +20° C. ------------------------------- 2159
    +100° C. ------------------------------ 2104
    +160° C. ------------------------------ [1] 1591

[1] Mainly failures of the metal.

Example V

A number of shear joints were made by applying a 10% solution of a thermosetting phenol-formaldehyde resin in ethyl alcohol to the faces of aluminium test pieces, air-drying for 30 minutes, interposing a homogeneous film consisting of equal weights of Rilsan B.C.O.P. 40 and polycaprolactam of between .005 and .010 inch thick and pressing for 1 minute at a temperature of 220° C. and at a pressure of 10 pounds per square inch. The average failing load at room temperature was 2,183 pounds.

Example VI

A number of shear joints were made by applying a 10% solution of a thermosetting phenol-formaldehyde resin in ethyl alcohol to the faces of aluminium test pieces, air-drying for 30 minutes, interposing a film of hexamethylene sebacamide (nylon 610) of between .005 and .010 inch thick and pressing for 1 minute at a temperature of 220° C. and a pressure of 10 pounds per square inch. The average failing load at room temperature was 2,075 pounds.

Example VII

A number of shear joints were made by applying a 10% solution of a thermosetting phenol-formaldehyde resin in ethyl alcohol to the faces of aluminium test pieces, air-drying for 30 minutes, interposing a homogeneous film consisting of equal weights of hexamethylene sebacamide and Rilsan B.C.O.P. 40 of between .005 and .010 inch thick, and pressing for 1 minute at a temperature of 220° C. and at a pressure of 10 pounds per square inch. The average failing load at room temperature was 2,116 pounds.

Example VIII

A number of shear joints were made by applying a 10% solution of a thermosetting phenol-formaldehyde resin in ethyl alcohol to the faces of stainless steel, air-drying for 30 minutes, interposing a film of hexamethylene adipamide (nylon 66) and pressing for 1 minute at 260° C. and at a pressure of 50 pounds per square inch. The average failing load at room temperature was 2,250 pounds. The average failing load of a set of test pieces similarly prepared but omitting the phenolic resin was 825 pounds.

Example IX

A number of shear joints were made by applying a 10% solution of a thermosetting phenol-formaldehyde resin in ethyl alcohol to the faces of titanium, air-drying for 30 minutes, interposing a film of Rilsan B.C.O.P. 40 and pressing for 5 minutes at a temperature of 185° C. and at a pressure of 50 pounds per square inch. The average failing load at room temperature was 2,240 pounds.

Example X

A number of shear joints were made by applying a 25% solution of a diphenylol propane formaldehyde resin (molecular ratio 1:2) to the faces of aluminium alloy, air-drying for 30 minutes, interposing a film of Rilsan B.C.O.P. 40 and pressing for 4 minutes at a temperature of 185° C. and at a pressure of 50 pounds per square inch. The average failing load at room temperature was 2,310 pounds.

Example XI

A number of shear joints were made by applying a 10% solution of a thermosetting phenol-formaldehyde resin in ethyl alcohol to the faces of aluminium test pieces, air-drying for 30 minutes, interposing a film of "nylon soluble polymer," and pressing for 10 minutes at 165° C. and 50 pounds per square inch. The average failing load at room temperature was 2,180 pounds. "Nylon soluble polymer" is "nylon 66" in which approximately 33% of the amino hydrogen atoms are replaced by methyl methoxy groups and is marketed by Imperial Chemical Industries Ltd., England. It is alcohol-soluble.

Example XII

A number of peeling joints were made by applying a 10% solution of a thermosetting phenol-formaldehyde resin in ethyl alcohol to aluminium test pieces, air drying for 30 minutes, interposing a film of "nylon soluble polymer" .010 inch thick, and pressing for 10 minutes at 165° C. and 50 pounds per square inch. The average failing load in the peeling test was 75 pounds.

It will be appreciated that the present invention not only provides a new method of securing adhesion between surfaces but provides new materials for use in that method. In particular there is provided a sheet material consisting essentially of a synthetic polyamide alone or coated onto a support sheet, carrying on its outer surfaces thin layers of uncured thermosetting resin of phenol-aldehyde type. Such material may be provided in roll form, and where there is a tendency for the turns to stick together there may be provided an interleaving film, e.g. of polyethylene.

What is claimed is:

1. In a process for securing adhesion between two surfaces by locating between the surfaces to be adhered together a self-supporting film consisting essentially of a synthetic linear polyamide constituted only of carbon, hydrogen, oxygen and nitrogen atoms, subjecting the assembly thus formed to a temperature sufficient to melt the polyamide and to a pressure at least sufficient to hold the assembly together, allowing the assembly to cool below the melting point of the polyamide, and then releasing the pressure, the improvement that between the self-supporting film and the surfaces to be adhered together a thermosetting resin consisting essentially of uncured phenol-formaldehyde resin is provided.

2. In a process for securing adhesion between two surfaces by locating between the surfaces to be adhered together a self-supporting film consisting essentially of a synthetic linear polyamide constituted only of carbon, hydrogen, oxygen and nitrogen atoms, subjecting the assembly thus formed to a temperature sufficient to melt the polyamide and to a pressure at least sufficient to hold the assembly together, allowing the assembly to cool below the melting point of the polyamide, and then releasing the pressure, the improvement that there is applied to the surfaces of the self-supporting film a thin coating consisting essentially of a thermosetting uncured phenol-formaldehyde resin and the coated film is located between the surfaces to be adhered together.

3. In a process for securing adhesion between two surfaces by locating between the surfaces to be adhered together a self-supporting film consisting essentially of a synthetic linear polyamide constituted only of carbon, hydrogen, oxygen and nitrogen atoms, subjecting the assembly thus formed to a temperature sufficient to melt the polyamide and to a pressure at least sufficient to hold the assembly together, allowing the assembly to cool below the melting point of the polyamide, and then releasing the pressure, the improvement that there is applied to the surfaces to be adhered together a thin coating consistently essentially of a thermosetting uncured phenol-formaldehyde resin and the self-supporting film is located between the coatings of said surfaces.

4. In a process for securing adhesion between two surfaces by locating between the surfaces to be adhered together a self-supporting film consisting essentially of a synthetic linear caprolactam polyamide having a melting point between 185 and 215° C., subjecting the assembly thus formed to a temperature sufficient to melt the polyamide and to a pressure at least sufficient to hold the assembly together, allowing the assembly to cool below the melting point of the polyamide, and then releasing the pressure, the improvement that between the self-supporting film and the surfaces to be adhered together a thermosetting resin consisting essentially of uncured phenol-formaldehyde resin is provided.

5. In a process for securing adhesion between two surfaces by locating between the surfaces to be adhered together a self-supporting film consisting essentially of a synthetic linear caprolactam polyamide having a melting point between 185 and 215° C., subjecting the assembly thus formed to a temperature sufficient to melt the polyamide and to a pressure at least sufficient to hold the assembly together, allowing the assembly to cool below the melting point of the polyamide, and then releasing the pressure, the improvement that there is applied to the surfaces of the self-supporting film a thin coating consisting essentially of a thermosetting uncured phenol-formaldehyde resin and the coated film is located between the surfaces to be adhered together.

6. In a process for securing adhesion between two surfaces by locating between the surfaces to be adhered together a self-supporting film consisting essentially of a synthetic linear caprolactam polyamide having a melting point between 185 and 215° C., subjecting the assembly thus formed to a temperature sufficient to melt the polyamide and to a pressure at least sufficient to hold the assembly together, allowing the assembly to cool below the melting point of the polyamide, and then releasing the pressure, the improvement that there is applied to the surfaces to be adhered together a thin coating consisting essentially of a thermosetting uncured phenol-formaldehyde resin and the self-supporting film is located between the coatings of said surfaces.

7. A process as claimed in claim 4, wherein the self-supporting film is 0.003 to 0.10 inch thick.

8. A process as claimed in claim 5, wherein the self-supporting film is 0.003 to 0.10 inch thick.

9. A process as claimed in claim 6, wherein the self-supporting film is 0.003 to 0.10 inch thick.

10. A process as claimed in claim 4, wherein the synthetic linear caprolactam polyamide is alcohol-soluble.

11. A process as claimed in claim 5, wherein the synthetic linear caprolactam polyamide is alcohol-soluble.

12. A process as claimed in claim 6, wherein the synthetic linear caprolactam polyamide is alcohol-soluble.

13. A process as claimed in claim 4, wherein the surfaces to be adhered together are metal surfaces.

14. A process as claimed in claim 5, wherein the surfaces to be adhered together are metal surfaces.

15. A process as claimed in claim 6, wherein the surfaces to be adhered together are metal surfaces.

References Cited in the file of this patent
UNITED STATES PATENTS

| | | |
|---|---|---|
| 2,271,961 | Wakeman | Feb. 3, 1942 |
| 2,405,038 | Jennings | July 30, 1946 |
| 2,650,185 | Larson et al. | Aug. 25, 1953 |
| 2,780,574 | Ott et al. | Feb. 5, 1957 |